United States Patent [19]

Drevet et al.

[11] 4,381,126

[45] Apr. 26, 1983

[54] HYDROSTATIC BEARING WITH ROTATING SLEEVE

[75] Inventors: Michel P. Drevet, Lyons, France; Jean Trouillet, Fontaine-Valmont, Belgium

[73] Assignee: Jeumont Schneider Corporation, Puteaux, France

[21] Appl. No.: 278,632

[22] Filed: Jun. 29, 1981

[30] Foreign Application Priority Data

Jul. 7, 1980 [FR] France .................................. 80 15046

[51] Int. Cl.$^3$ .............................................. F16C 32/06
[52] U.S. Cl. ..................................... 384/114; 384/286
[58] Field of Search ............. 308/9, DIG. 1, DIG. 4, 308/240, 238, 237 A, 237 R, 122

[56] References Cited

U.S. PATENT DOCUMENTS

| | | | |
|---|---|---|---|
| 2,663,599 | 12/1953 | Mackay et al. ............... | 308/DIG. 4 |
| 4,181,480 | 1/1980 | Balsiger ..................... | 308/9 |
| 4,215,903 | 8/1980 | Andrews ..................... | 308/9 |
| 4,290,655 | 9/1981 | Apuzzo et al. ................ | 308/240 |

*Primary Examiner*—Lenard A. Footland
*Attorney, Agent, or Firm*—Rines and Rines, Shapiro and Shapiro

[57] ABSTRACT

The invention concerns hydrostatic bearings supplied with fluid under pressure for a shaft rotating at high speed in a fixed bed, with the goal of reducing the power dissipated by shear of the fluid in the said bearings.

According to the invention, a sleeve (5) is disposed coaxially to the shaft (1) in a chamber arranged for this purpose between the bed (3) and the shaft (1), with apertures being arranged respectively in the shaft and in the bed, opposite the sleeve on one side and the other, in such a way that a movement in rotation can be imparted to the sleeve (5), the structure being particularly applicable to fluid pumps.

6 Claims, 4 Drawing Figures

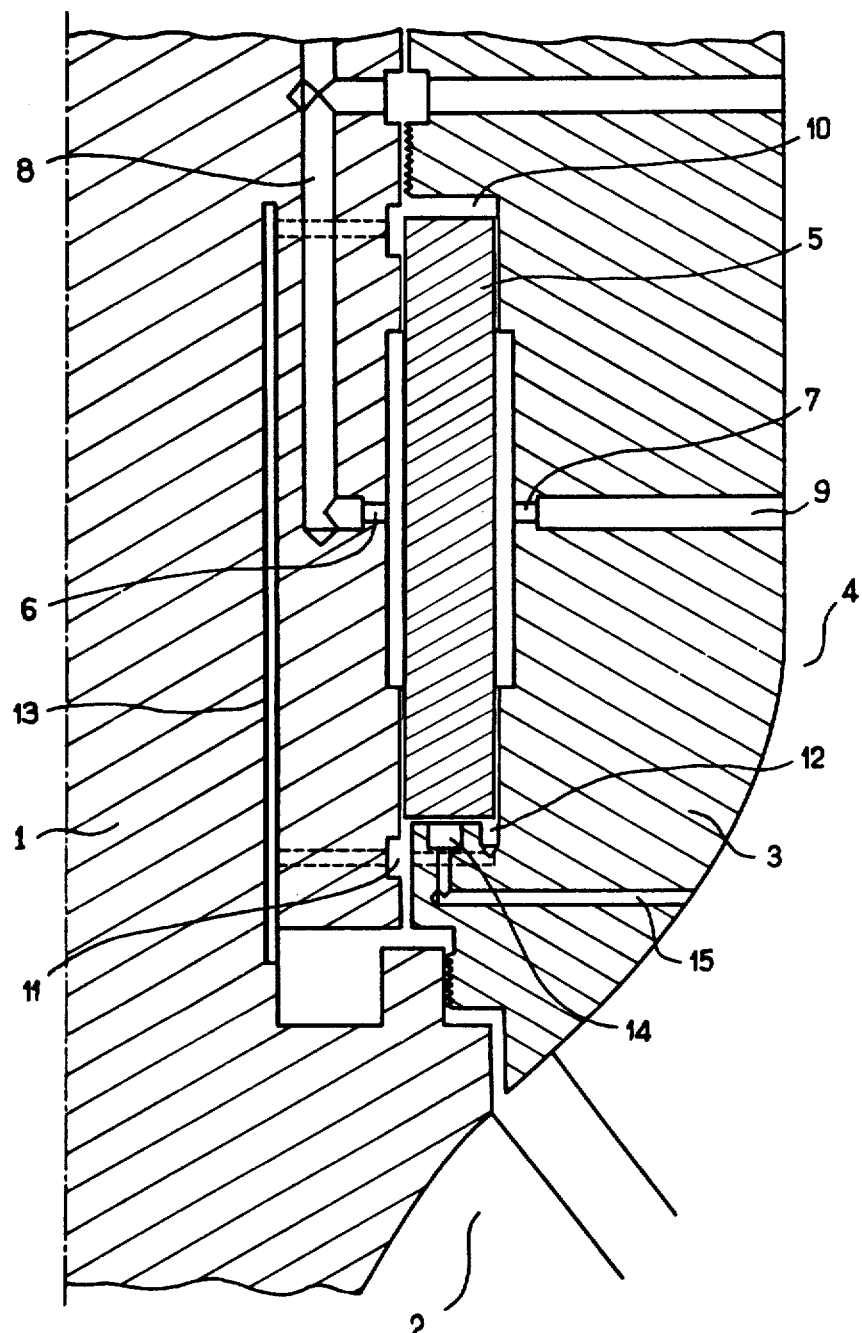
FIG_1

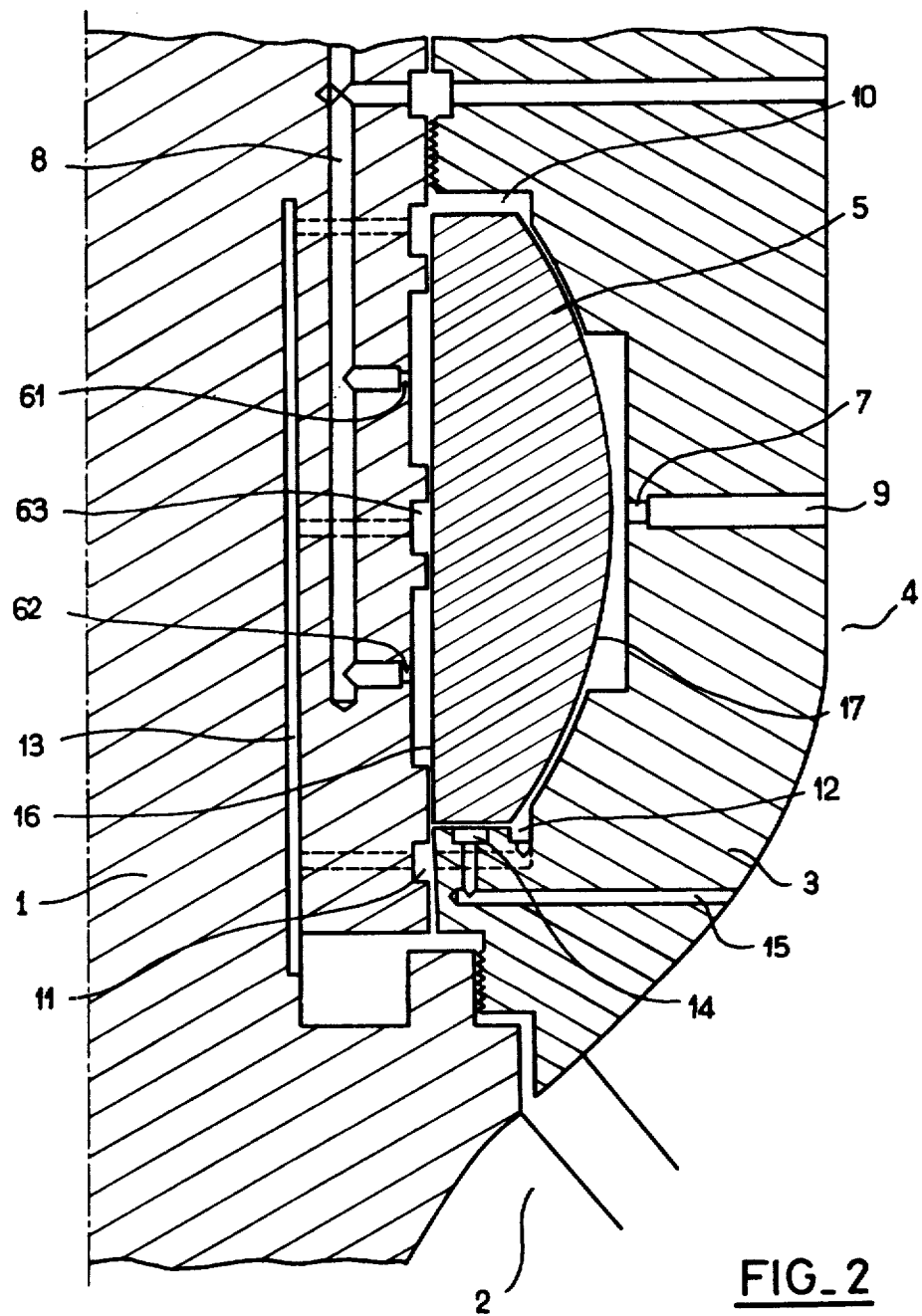
FIG_2

HYDROSTATIC BEARING WITH ROTATING SLEEVE

The present invention concerns hydrostatic bearings supplied with fluid under pressure for a shaft turning at high speed in a fixed bed.

In a general way, such bearings comprise a race created in a wear resistant material, integrally attached to the bed supporting the shaft, in which race are arranged apertures supplied with fluid under pressure, in order to create a film of fluid between the journal of the shaft and the race, and thus to reduce the friction.

On contact with the shaft, the supplied fluid is subjected to a shear due to the rotation of the shaft, thus dissipating a significant amount of energy. This energy is essentially proportional to the cube of the speed of rotation of the shaft.

The present invention has as its goal to reduce the energy dissipated by shearing of the fluid in such a bearing by means of a rotating sleeve, providing a novel hydrostatic bearing construction.

In summary, the invention employs a sleeve arranged coaxially to the shaft in a chamber provided between the bed and the shaft, with the apertures supplied with fluid being disposed respectively in the shaft and in the bed, on one side and the other of the sleeve, in such a way that a motion in rotation around its axis can be imparted to the sleeve.

According to a preferred mode of realization of the invention, the inner surface of the sleeve is cylindrical, with two series of apertures supplied with fluid under pressure being disposed in the shaft opposite the sleeve, between which an additional aperture is also arranged for the outlet of the fluid, while the outer surface of the sleeve takes on a partially spherical form, with the aperture placed in the bed opposite it taking on a partially complementary form, so as to enable automatic correction of any misalignment of the shaft.

According to a variation of realization, means such as gear wheels and pinions are provided to drive the sleeve in rotation around its axis, particularly at an angular velocity essentially equal to half that of the shaft.

The invention will be better understood, and other goals, advantages and characteristics will appear more clearly, from the reading of the following description of various modes of realization of the invention, given in a non-limitational sense, to which description are appended three plates of drawings.

FIG. 1 represents in partial axial section a bearing conforming to the present invention.

FIG. 2 represents, also in partial axial section, a hydrostatic bearing conforming to the present invention; ad

Figure 3A:
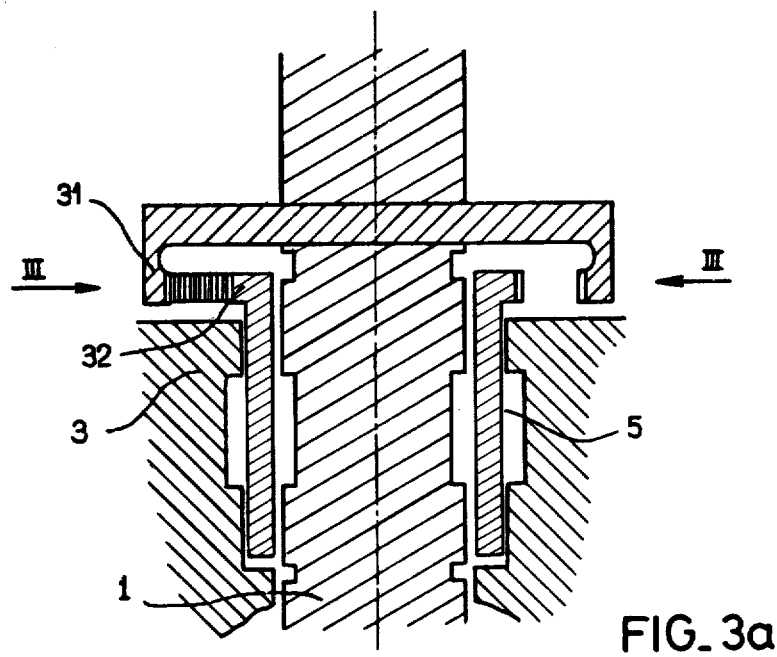
FIGS. 3a and 3b represent schematically, in axial and radial sections, respectively, a mode of driving the sleeve included in a hydrostatic bearing conforming to the present invention.

It is known that the power P dissipated by shear of the fluid in a hydrostatic bearing can be very significant. For example, for a shaft turning at 1,500 rotations per minute in a bearing of 0.90 meters diameter supplied with water at 20° C., the power dissipated by the shear of the fluid is greater than 100 kW.

By doubling the effective surfaces by means of a sleeve to which is imparted a speed of rotation equal to half that of the shaft, and in the same experimental conditions, the power dissipated by shear of the fluid is reduced by about 70%, and lies at about 30 kW.

There is futhermore observed an increase of 15 to 20% in the rigidity of the shaft in the latter case.

Referring to the figures representing various modes of realization of the invention applied to guidance of the vertical shaft of a fluid pump, the shaft 1 drives in rotation a vane wheel 2; a fixed bed 3 makes it possible to define a space 4 in which circulates the fluid pumped under pressure, which is to supply the apertures of the bearing.

A sleeve 5 is arranged coaxially to the shaft 1 in a chamber arranged for this purposed between the bed 3 and the shaft 1, and apertures are arranged within the walls facing the sleeve, that is, in the shaft 1 and in the bed 3.

These apertures are supplied with fluid under pressure by means of nozzles 6, 7 connected to the space 4 by ducts 8, 9. Low pressure chambers 10, 11, 12 make it possible to ensure outlet of the fluid to a duct 13 connected to the low pressure section of the pump.

In the example represented, the shaft of the pump is vertical, and a shoulder bearing acting axially is necessary to ensure support of the sleeve 5.

A complementary aperture 14 is thus connected to the high pressure space 4 by means of a duct 15, with the low pressure chambers 11 and 12 making it possible to ensure the outlet of the fluid introduced through the aperture 14.

The variation of realization represented in FIG. 2 in addition enables correction of an accidental misalignment of the shaft.

The inner surface 16 of the sleeve 5 is cylindrical, while the outer surface 17 takes on a spherical form. For this reason, the corresponding aperture arranged in the bed takes on a partially corresponding form to give a supplementary degree of freedom to the sleeve 5.

To correct misalignments, two apertures must be arranged in the shaft, and supplied with fluid under pressure by the nozzles 61, 62 connected through the intermediary of the duct 8 to the space 4 under pressure. Moreover, an expansion chamber 63 must be disposed between the two apertures in order to ensure the outlet of the fluid to the duct 13.

Figure 3B:
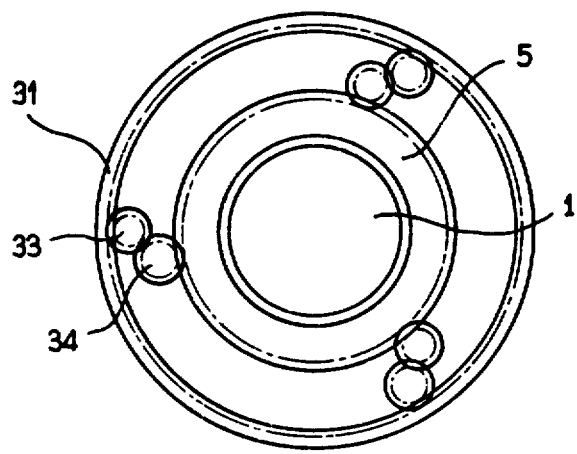

In the examples represented in FIGS. 1 and 2, the sleeve is free in rotation, its movement being imparted to it by the friction of the fluid on its walls. Nonetheless, it may be necessary to constrain the sleeve 5 to have a given speed of rotation, in particular a speed of rotation equal to half that of the shaft 1, as represented by FIGS. 3a and 3b. The necessary means may advantageously be constituted by the combination of a toothed wheel 31 integrally connected to the shaft 1, another toothed wheel 32 integrally connected to the sleeve 5, these two being concentric, a number of pinions 33, 34 transmitting the motion of rotation of the wheel 31 to the wheel 32, with a given transformation ratio, constituting, for example, a speed reducer.

Although only certain modes of realization of the invention have been described, it is evident that any modification brought about by the man of art in the same spirit will not constitute a departure from the framework of the present invention. In particular, the sleeve 5 may be driven in rotation by any other means, for example by means of an auxiliary motor.

We claim:

1. Hydrostatic bearing with fluid under pressure for a shaft rotating at high speed in a fixed bed, unique in that a sleeve is arranged coaxially to the said shaft in a chamber created for this purpose between the said bed and the said shaft, with apertures supplied with fluid being disposed respectively in the said shaft and in the said bed, opposite the said sleeve on one side and the other, in such a way that a movement in rotation around its axis can be imparted to the said sleeve.

2. Bearing according to claim 1, unique in that the inner surface of the said sleeve is cylindrical, with two series of apertures supplied with fluid being arranged in the shaft opposite the said sleeve, between which an additional aperture is also arranged for the outlet of the fluid, while the outer surface of the said sleeve takes on a partially spherical form, with the aperture arranged in the bed opposite taking on a partially complementary form.

3. Bearing according to claim 1, unique in that, with the shaft vertical, an aperture is arranged in the said bed at the base of the said sleeve in order to ensure the support of the latter.

4. Bearing according to claim 1, unique in that additional means are provided to drive the said sleeve in rotation around its axis.

5. Bearing according to claim 4, unique in that the said sleeve is provided with a toothed wheel concentric to a toothed wheel integrally attached to the said shaft, with a number of pinions interacting with the said wheels in order to impart a motion of rotation to the sleeve from the rotation of the said shaft.

6. Bearing according to claim 5, unique in that the said pinions are disposed so as to constitute a speed reducer.

* * * * *